United States Patent [19]

Harlow

[11] Patent Number: 4,625,807

[45] Date of Patent: Dec. 2, 1986

[54] METHOD AND APPARATUS FOR RECOVERY OF WATER-IMMISCIBLE LIQUIDS FROM WATER-BEARING FORMATIONS

[76] Inventor: Delmont E. Harlow, 100 Canada Via, Diablo, Calif. 94528

[21] Appl. No.: 744,830

[22] Filed: Jun. 14, 1985

[51] Int. Cl.⁴ ............ E21B 34/08; E21B 43/12; E21B 44/00; F04F 1/08
[52] U.S. Cl. .................................. 166/370; 166/53; 166/66; 166/325; 166/372; 210/104; 210/923; 417/118; 417/138; 417/143
[58] Field of Search .......... 166/53, 64, 66, 72, 166/325, 369, 370, 372; 210/104, 117, 120, 923; 417/118, 137, 138, 143

[56] References Cited

U.S. PATENT DOCUMENTS

| | | | |
|---|---|---|---|
| 813,322 | 2/1906 | Richards | 417/118 |
| 2,412,723 | 12/1946 | Elliott | 417/138 |
| 3,275,021 | 9/1966 | Loveless | 417/138 X |
| 3,915,225 | 10/1975 | Swink | 166/53 |
| 4,273,650 | 6/1981 | Solomon | 210/104 |
| 4,345,647 | 8/1982 | Carmichael | 166/66 |
| 4,527,633 | 7/1985 | McLaughlin et al. | 166/53 X |
| 4,546,830 | 10/1985 | McLaughlin et al. | 417/118 X |

FOREIGN PATENT DOCUMENTS 865622  4/1961 United Kingdom ............... 417/118

Primary Examiner—George A. Suchfield
Attorney, Agent, or Firm—Townsend and Townsend

[57] ABSTRACT

Ground water pollutant floating above the water table in a water-bearing formation is removed through a well penetrating the formation by lowering the water level so that pollutant from the region surrounding the well will flow into the well due to gravitational force, and lowering a liquid-retaining vessel into the well to a depth whereby a liquid entry port in the vessel is in the pollutant layer above the water level. The vessel is constructed to receive the liquid pollutant by gravitational flow through the liquid entry port, the displaced gas leaving through a vent. A compressed air line feeds the vessel to purge its interior of accumulated liquid through an exit port on an intermittent basis. Check valves associated with each port are actuatable by the influence of the compressed air to prevent leakage of discharged pollutant back into the vessel and to provide complete and efficient purging when the compressed air is flowing. The vessel is incorporated into a system of components including a water pump for lowering the water level in the well, a source of compressed air, a pollutant recovery tank, and control circuits for both the compressed air and the water pump.

8 Claims, 3 Drawing Figures

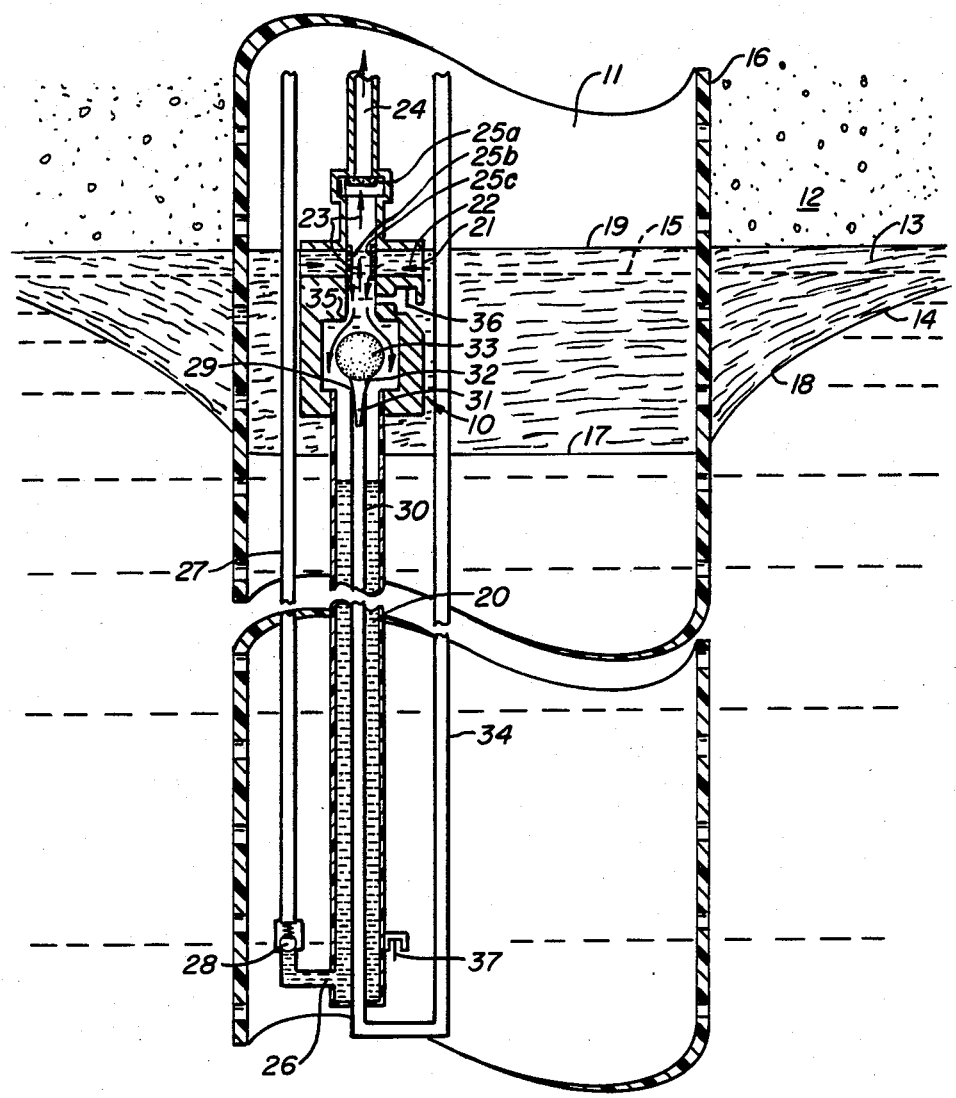
FIG._1.

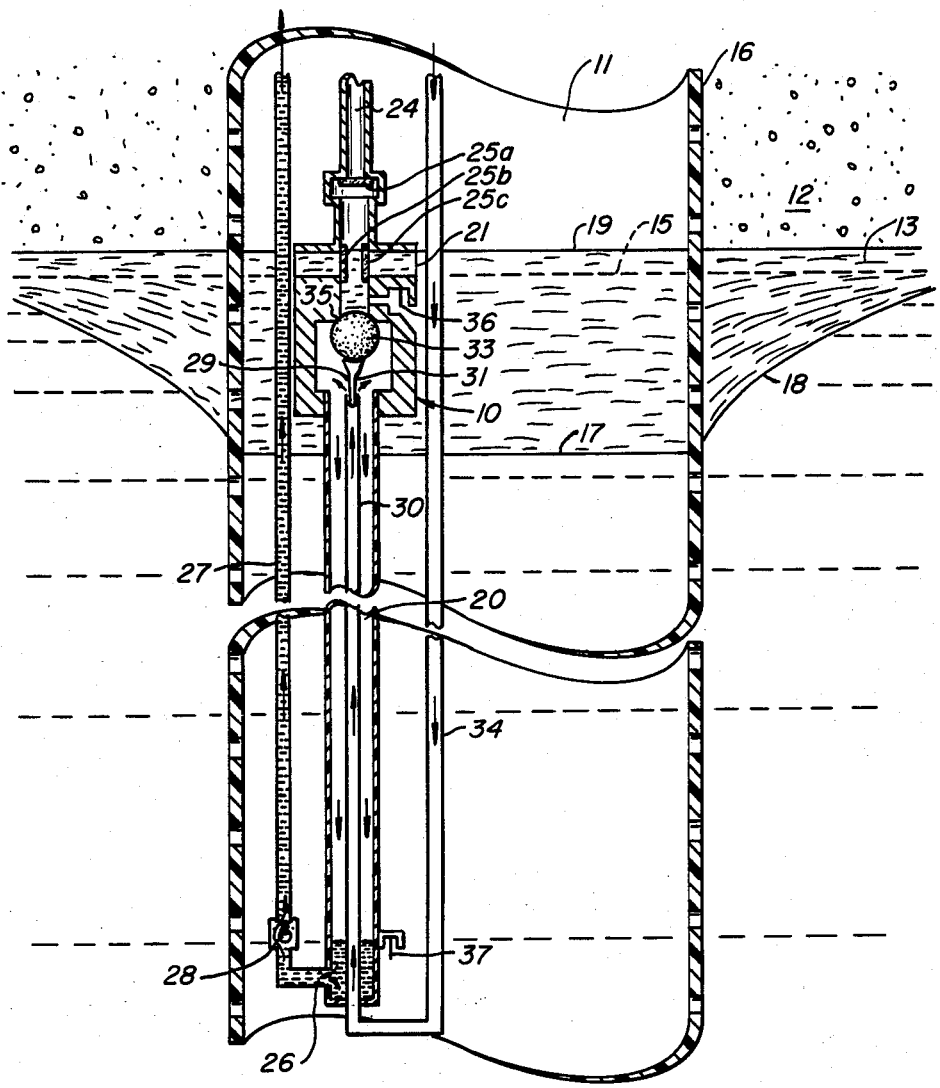
FIG._2.

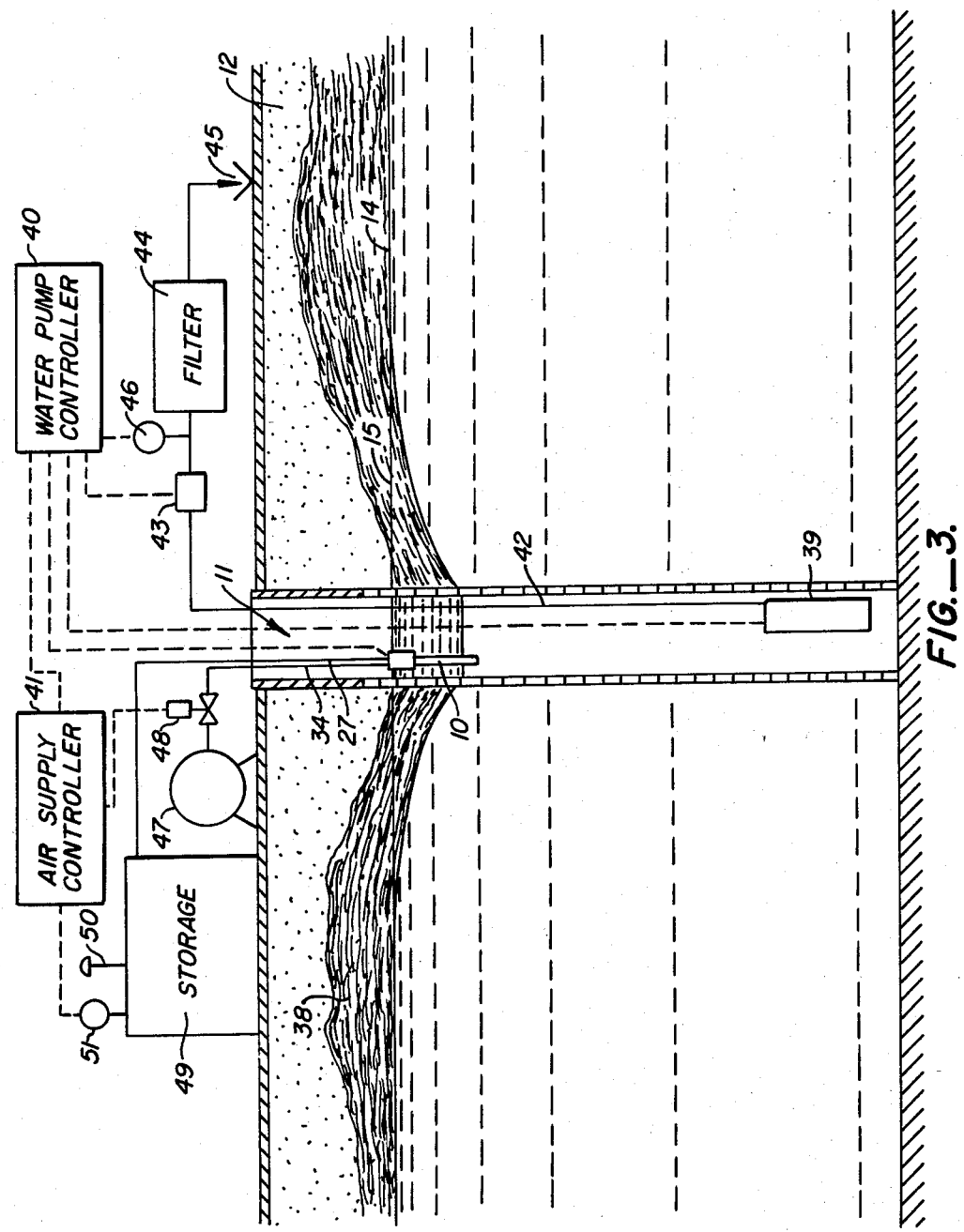
FIG._3.

METHOD AND APPARATUS FOR RECOVERY OF WATER-IMMISCIBLE LIQUIDS FROM WATER-BEARING FORMATIONS

BACKGROUND OF THE INVENTION

This invention relates to ground water pollution control, in particularly to the recovery of liquid pollutants which are substantially immiscible with water and tend to rest above the water table in a water-bearing ground formation.

An effective way for extracting a liquid hydrocarbon or other water-immiscible pollutant from ground water is to drill a well in the center of the contaminated region to a depth well below the water table, then lower the water level in the well by pumping out water, and finally remove pollutant from the layer floating above the water in the well as the pollutant flows inward from the surrounding area by gravitational flow. Pollutant removal is generally achieved by a pump which is designed or programmed to draw liquid from the pollutant layer only. Extraction is generally begun while the pollutant is still a plume in the ground formation above the water table, before extensive lateral spreading over the water table due to gravitational force has occurred. Several strategically placed wells are often required, depending on the size of the plume, the degree of spreading, and the shape of the contaminated area. The depth to which the water level in any particular well must be lowered will depend on the size of the plume.

Typical of existing devices is that disclosed in Solomon, U.S. Pat. No. 4,273,650 (June 16, 1981), wherein an electric pump for periodic operation is lowered directly into the well and submerged in the hydrocarbon layer above the water table. By placing an electric motor in direct contact with a frequently flammable pollutant, this device poses a serious risk of fire or explosion. In addition, soil, rock and other debris present in the well interfere with the pump, resulting in frequent malfunctions and clogging of lines.

SUMMARY OF THE INVENTION

A novel method, apparatus, and overall system are provided for the selective removal of a liquid ground water pollutant from a well as described above, fully avoiding contact between the pollutant and any pump motors and other moving parts. According to the invention, a liquid-retaining vessel is designed to be lowered beneath the pollutant liquid level, to receive the liquid pollutant by gravitational flow through a liquid entry port. A gas entry port in the vessel admits pressurized gas to purge accumulated liquid from the vessel through an exit port leading to a waste recovery tank above ground. Check valves associated with the various entry and exit ports provide for efficient utilization of the interior space of the vessel for rapid extraction of pollutant. The check valves are adapted to respond to the purge gas pressure, enabling complete control of the filling and purging cycles by the feed and shutoff of the purge gas. The novel features of the vessel are further incorporated in an extraction method involving the intermittent feed of compressed purge fluid to the vessel to alternately purge the vessel interior and permit it to be filled with pollutant, and in an overall system which further incorporates a pump for lowering the water level inside the well plus control devices for actuating the pump on an intermittent basis, permitting the water level to rise as the pollutant is extracted.

BRIEF DESCRIPTION OF THE DRAWINGS

FIG. 1 is a side cutaway view of a liquid retaining vessel and associated components in accordance with the present invention, with pollutant resting above a depressed water table entering to fill the interior of the vessel.

FIG. 2 is a side cutaway view of the vessel shown in FIG. 1, being purged of liquid pollutant with compressed air.

FIG. 3 is a combination side cutaway view and block diagram of an extraction system within the scope of the present invention, incorporating a liquid retaining vessel such as that shown in FIGS. 1 and 2.

DETAILED DESCRIPTION OF THE INVENTION AND PREFERRED EMBODIMENTS

As shown in FIG. 1, a liquid retaining vessel 10 is lowered into a well 11 drilled through a water-bearing formation 12. The formation 12 has been contaminated by a water-immiscible liquid pollutant which, being of less density than water, rests in a layer 13 above the water table 14. Although shown in FIG. 1 for purposes of convenience as a flat layer, the pollutant will frequently be in the form of a plume above the water table, the plume gradually flattening and spreading outward over the water table under the influence of gravity. The rate at which this occurs varies with the permeability of the soil with respect to the pollutant and the shape of the water table. The shape and stability of the pollutant is further influenced by the ground water flow velocity. Thus, the plume may stream out in a single direction or spread evenly in all directions along the horizontal.

The well 11 is drilled through the formation to a depth well below the water table, which in its undisturbed state occupies the position shown in the Figure by the dashed line 15. To prevent collapse of the well, an apertured casing 16 may be inserted therein, with walls capable of retaining the formation itself yet freely permeable to fluids.

It will be noted from the Figure that the water level 17 inside the well itself has been lowered below the level of the undisturbed water table 15 to cause the pollutant 13 to flow by gravitational force from the surrounding areas through the well casing 16 and to the well. Lowering of the water level in the well is conveniently achieved by pumping water from the well up to the ground surface. The resulting water table will have sloping sides 18, forming an inverted cone of depression with the well as the apex. The shape of the pollutant layer during and immediately folowing the lowering of the water level in the well will generally be a second hollow inverted cone inside the cone of depression, due to the resistance to pollutant flow from the surrounding formation into the well. The water level may then be held down by continued pumping or permitted to rise. In either case, the flow of pollutant toward the well will result in the gradual filling of the space between the lowered water level 17 and either the undisturbed water table 15 or an equilibrium height 19 corresponding to the top of the pollutant layer 13 in the surrounding formation, depending on the shape and distribution of the plume. The condition shown in FIG. 1 is thus representative of the condition some time after the water level in the well has been lowered.

The liquid retaining vessel 10 has an interior liquid receiving space 20, fed by at least one or a series of liquid entry ports 21. The latter are situated near the top of the liquid receiving space 20 to permit filling the latter by gravitational flow. Accordingly, the vessel is positioned such that the liquid entry ports 21 are at least partially, preferably entirely, submerged in the pollutant layer in the well (i.e., between the lowered water level 17 and the upper surface 19 of the pollutant layer). In most applications, the liquid entry ports will be placed beneath the lowered water level 17 and the level of the undisturbed water table 15, preferably at a position approximately level with the undisturbed water table, as shown.

As the pollutant liquid enters the liquid entry ports, it flows by gravity in the direction indicated by the arrows 22 to the liquid receiving space 20. The air thus displaced by the incoming pollutant rises upward in the direction of the arrows 23 to a vent 24, with solid matter having first been collected in a filter 25a in the vent passage. Additional filters 25b and 25c in the entry ports help to prevent internal clogging.

Toward the bottom of the liquid retaining vessel is an exit port 26. Extending from the port is a conduit 27 through which fluid is conveyed upward out of the well. A check valve 28 in the conduit prevents backward flow of fluid into the interior space 20 of the vessel. Backward leak prevention may be further ensured by using a spring-mounted bulb as shown or similar arrangement as the check valve 28. Thus, even when the exit conduit 27 is filled with air rather than liquid, the check valve 28 will remain closed even under the force of the head from the interior space 20 of the vessel as the latter is being filled. This will prevent oscillation of the liquid level inside the vessel and any splashing which might result, thereby minimizing cogging of lines and the leakage of pollutant into the compressed air lines, which are described further below.

The liquid retaining vessel 10 is elongate in shape in order to fit inside a narrow well and yet provide a substantial interior volume. Such a shape is favorable for filling by gravitational flow, as well as for efficient purging of accumulated liquid by compressed gas. Compressed gas is fed through a gas entry port 29 opening into the interior space 20 of the vessel, near the end opposite the end at which the exit port 26 is located. For convenience of construction in an elongated vessel of the type shown, the gas entry port 29 is the open upper terminus of an internal tube 30, extending substantially the full height of the interior space 20 of the vessel, and generally coaxial therewith.

In particularly preferred constructions, the vessel is generally cylindrical in shape, the interior liquid receiving space 20 thus being an annular space encircling the internal air tube 30.

The gas entry port 29 is sealed with a loosely fitting piston 31 having a flared top 32 which extends out over the rim of the port. The weighted ball 33 rests atop the flared top of the piston, helping to force the flared top 32 of the piston down against the port rim in the absence of air pressure inside the tube 30.

Turning now to FIG. 2, the vessel is shown in the purging mode, which is begun after sufficient time for filling the interior space 20 with pollutant has been permitted to elapse. Purging is achieved by feeding a purge fluid under positive pressure, most conveniently compressed air from an external source outside the well. The pressure of the purge gas is sufficient to raise the piston 31 at the top of the internal tube 30, thus opening the gas entry port 29. The gas pressure further forces the weighted ball 33 up against an internal seat 35 against which the ball seals to stop liquid flow from the liquid entry ports 21 to the internal space 20 of the vessel. The weighted ball thus operates as a check valve, preventing outward gas flow through the liquid entry ports 21 during the purge, thereby providing efficient use of the purge gas. Thus, the ball 33 and piston 31 with its flared top 32 together form a double-action check valve operating between two sealing positions, one against the gas entry port 29 and the other against a seat 35 sealing off liquid flow into the interior space 20 of the vessel.

In preferred embodiments, the ball-and-piston combination has a path of travel between its two seating positions of sufficient distance to permit a momentary flow of purge gas from the gas entry port 29 around the piston and ball, through the seat 35 and out the liquid entry ports 21, before the ball 33 is sealed firmly against its seat 35. Thus, any solid matter which has collected on the filters 25a, 25b, or 25c will be blown off and the passages cleared. The purge gas pressure, as transmitted through the liquid inside the interior space 20 of the vessel will also force open the check valve 28, permitting flow of the accumulated liquid out the exit conduit 27.

Once purging is completed, the compressed air feed is discontinued. It is frequently also necessary to release the pressure in the feed line 34 after flow has been discontinued, by bleeding off the static air. The weighted ball 33 is then able to fall to its original position as shown in FIG. 1, and the liquid receiving space 20 thus becomes open to the liquid entry ports 21. Bleeding off of the pressure is conveniently achieved by opening the feed line 34 to the atmosphere during the filling mode (FIG. 1). This may be done by the use of a three-way valve as the valve controlling the compressed air feed.

The activation of all check valves and hence the opening and closing of the liquid entry, gas entry, and exit ports is thus entirely controlled by the presence or absence of compressed air in the feed line 34. By alternately feeding and turning off the compressed air (and bleeding off the static pressure), one alternately forces the accumulated liquid from the vessel space out of the well and refills the vessel space with liquid from the pollutant layer. This is conveniently achieved by periodic cycling of the compressed air, using time intervals of preselected duration, adapted for the volume of the liquid receiving space 20 and the flow characteristics of the various ports and passages. In the optimal case, the air will be off for a sufficient period of time to substantially fill the space with pollutant liquid, then on for a sufficient period of time to force substantially all liquid out the exit conduit. These times are readily determinable by trial runs using fluid of the approximate viscosity of the expected pollutant and a purge gas of the approximate pressure of that intended to be used. The timing may be programmed by a controller, as described in more detail below.

As mentioned above, as the filling and purging modes alternate in a repeated cycling program, the water level 17 in the well originally lowered below the undisturbed water table 15, may be maintained at a static depth by continuous pumping of water from the well, or may be permitted to rise toward its equilibrium level. In either case, the vessel 10 is lowered sufficiently into the well to permit flow of liquid from the liquid pollutant layer above the water level 17 into the liquid entry ports 21. In preferred embodiments, the water level 17 is permitted to rise by the natural flow of water from the surrounding formation as the vessel is cycling through its filling and purging phases. As the water level reaches that of the undisturbed water table 15, the removal of water from the well is begun once again, lowering the water level to a depth from which it will be permitted to rise once more.

Timing of the water removal may be controlled by sensors at specified depths, capable of distinguishing water from the water-immiscible pollutant. In the embodiment shown in the drawings, one such sensor 36 is positioned on the exterior of the vessel toward its upper end, adjacent to the liquid entry ports 21 (a high water level sensor). A second, low water level sensor 37 is positioned on the exterior of the vessel toward the bottom. The former is adapted to energize a pump or other water removal apparatus when the sensor contacts water, while the latter de-energizes the pump or apparatus when it loses contact with water. Thus, as the water level rises to contact the high level sensor 36, a signal is emitted, turning on the water pump, which remains on until the water level falls below the low level sensor 37, at which point the pump is turned off. In further preferred embodiments, the cycling of the compressed air is suspended while the water pump is on. The high and low water level sensors may be any of a variety of devices capable of distinguishing water from other substances, either liquid or gaseous. Examples include electrical and thermal conductivity sensors, electrical conductivity being preferred.

In the embodiment shown in the drawings, the high level sensor 36 is at a level slightly below the level of the liquid entry ports 21, for purposes of convenience of construction. It is preferable, however, to permit the water level to rise all the way to the liquid entry ports before it is pulled down again by the water pump, for maximum efficiency. This is readily achieved by incorporating a time delay into the pump control circuit to compensate for the height difference.

Turning now to FIG. 3, a full pollutant recovery system is shown, incorporating a liquid retaining vessel such as that depicted in FIGS. 1 and 2. As in the previous figures, the well 11 is drilled in the water bearing formation 12 below the water table 14 toward the center of a plume 38 of liquid pollutant. A water pump 39 is placed inside the well, far below the liquid surface and fully submerged in the water. The liquid retaining vessel 10 depicted in detail in FIGS. 1 and 2 is also lowered into the well, in the vicinity of the undisturbed water table 15. The dashed lines are transmission lines for activating signals, preferably electrical, controlled by a combination of controllers, i.e., a water pump controller 40 and an air supply controller 41.

Effluent from the water pump is directed through an effluent conduit 42 through a flow indicator and totalizer 43 and filter system 44 to a drain 45. The flow controller may be a variable orifice or other restriction device such as those well known in the art, to indicate the rate of water flow emerging from the pump and thereby the rate at which the water level in the well is lowered. The filter system may be comprised of any conventional apparatus for removing solid matter from an aqueous stream. A pressure sensor 46 may be inserted between the flow controller and filter system to shut the water pump down in the event of excessive pressure build up as might result from clogging of the filter system.

A source of compressed air 47, shown here as a pump, supplies compressed air to the submerged liquid retaining vessel 10 for purging purposes, through line 34. Installed in the line is a remotely operated two-position control valve 48, conveniently an electrically operated solenoid valve, which may be a three-way valve open to the atmosphere for the reasons indicated above. Effluent from the submerged vessel, released during purging with compressed air, flows out through line 27 to a waste tank 49 located above ground as shown or underground. The waste tank is preferably equipped with a vent 50 and a high level sensor 51, adapted to send a signal to the air supply controller 41 when the liquid level in the waste tank exceeds a preselected height. Upon receiving this signal, the controller may then transmit a signal to the compressed air control valve 48, causing the latter to close and thereby preventing further liquid from being taken from the well.

As mentioned above, the air supply controller 41 may be programmed to alternately energize and de-energize the compressed air solenoid 48 in repeated manner at preselected time intervals. The water pump controller 40 may be adapted to override the air supply controller 41 when the water pump is on, and signals from the high and low water level sensors 36, 37 on the liquid retaining vessel (not shown in FIG. 3) may govern the activation of the water pump.

The dimensions, materials of construction, timing features and other parameters of the apparatus, method and system described herein are all variable over a wide range; none are critical to the operation of the invention. An example of one embodiment which will provide effective results in most applications is one in which the liquid retaining vessel is constructed according to the drawings in FIGS. 1 and 2 herein, with an exterior shell of ¾-inch I.D. (1.9 cm) polyvinyl chloride pipe (inner diameter), 24 inches (61 cm) in length, with ¼-inch O.D. (0.6 cm) copper tubing passing coaxially through the center of the pipe as the internal tube 30, and using a typical compressed air cycle of 11 seconds off and 3.5 seconds on.

The foregoing description is offered for illustrative purposes only. Numerous modifications and variations beyond those mentioned herein but still falling within the spirit and scope of the invention will be readily apparent to those skilled in the art.

What is claimed is:

1. Apparatus for the extraction of a water-imiscible liquid of less density than water from a well in a water-bearing formation, comprising:
    an elongate liquid-retaining vessel having a first end and a second end, and having a liquid entry port and a gas entry port toward said first end and an exit port toward said second end;
    a first check valve positioned in said first end between said liquid entry port and said gas entry port, normally sealed against said gas entry port and movable by compressed gas flowing from said gas entry port to seal against said liquid entry port;
    a second check valve positioned in said exit port, normally closed, operable by compressed fluid flow from said vessel;
    means for feeding compressed gas to said vessel through said gas entry port for discrete time periods of preselected duration; and an air vent in said vessel positioned to permit the escape of air therefrom during flow of liquid into said vessel through said liquid entry port, said air vent being sealable from the interior of said vessel by said first check valve upon the flow of compressed gas from said gas entry port.

2. Apparatus for the extraction of a water-immiscible liquid of less density than water from a well in a water-bearing formation, comprising:

an elongate liquid-retaining vessel sized to fit inside said well, having an upper end and a lower end and an interior space, and having a liquid entry port toward said upper end, a gas tube extending longitudinally therethrough terminating inside said vessel in a gas entry port below said liquid entry port and facing said upper end, an exit port toward said lower end, and an air vent to permit the escape of air from said interior space during the filling thereof by liquid through said liquid entry port;

a first check valve positioned between said gas entry port and said liquid entry port, normally sealed by gravitational force against said gas entry port and adapted to be opened by gas flow from said gas entry port to seal said liquid entry port and said air vent from said interior space;

a second check valve positioned in said exit port, normally closed, openable by compressed fluid flow from said interior space; and means for feeding compressed gas to said interior space through said gas tube for discrete time periods of preselected duration.

3. A method for removing a water-imiscible liquid of less density than water from a water-bearing formation, comprising:

(a) lowering the water level in a well penetrating said formation to a preselected level substantially lower than that of the undisturbed water table of said formation;

(b) filling a liquid-retaining vessel lowered into said well and maintained at a substantially constant depth therein with liquid from the layer of water-immiscible liquid above said lowered water level, by gravitational flow through a liquid entry port in said vessel approximately level with said undisturbed water table, while permitting said lowered water level to rise toward the level of said undisturbed water table;

(c) purging said vessel with compressed air at sufficient pressure to open a normally closed check valve in a liquid exit port therein and to close a normally open check valve in said liquid entry port, thereby emptying the contents of said vessel out said liquid exit port, while permitting said lowered water level to rise toward the level of said undisturbed water table;

(d) repeating steps (b) and (c) until said lowered water level reaches a preselected height approximately level with said undisturbed water table; and (e) repeating steps (a), (b), (c) and (d) until substantially all said said water-immiscible liquid is removed from said formation.

4. A system for the extraction of a water-immiscible liquid of less density than water from a well in a water-bearing formation, comprising:

an elongate liquid receiving vessel sized to fit longitudinally inside said well, said vessel having a top end and a bottom end, a liquid entry port and a gas entry toward said top end, each port having a check valve adjacent thereto to impede outward flow, and an exit port toward said bottom end having a check valve therein to impede inward flow;

means for periodically feeding compressed air to said vessel through said gas entry port to purge said vessel of liquid accumulated therein;

a closed conduit communicating said exit port with a receptacle external to said well;

a pump adapted to remove water from said well and thereby lower the water level therein; and a first water level sensor on the exterior of said vessel adjacent to said liquid entry port and a second water level sensor on the exterior of said vessel toward said bottom end, said first water level sensor actuatable by contact with water and said second water level sensor actuatable by loss of contact with water.

5. A system for the extraction of a water-immiscible liquid of less density than water from a well in a water-bearing formation, comprising:

an elongate liquid receiving vessel sized to fit longitudinally inside said well, said vessel having a top end and a bottom end, a liquid entry port and a gas entry port adjacent said top end, each said port having a check valve adjacent thereto to impede outward flow, an exit port adjacent said bottom end having a check valve therein to impede inward flow, a first water level sensor on the exterior of said vessel adjacent said liquid entry port adapted to emit a first signal upon contact with water, and a second water level sensor on the exterior of said vessel toward said bottom end adapted to emit a second signal upon loss of contact with water;

means external to said well for periodically feeding compressed air to said vessel through said gas entry port to purge said vessel of liquid through said exit port;

a closed conduit communicating said exit port with a receptacle external to said well;

a pump adapted to remove water from said well and thereby lower the water level therein; and means for activating said pump and suspending said compressed air feeding means upon said first signal, and for deactivating said pump and reactivating said compressed air feeding means upon said second signal.

6. Apparatus for the extraction of a water-immiscible liquid of less density than water from a well in a water-bearing formation, comprising:

an elongate liquid-retaining vessel having a first end and a second end, and having a liquid entry port and a gas entry port toward said first end, said gas entry port being positioned below said liquid entry port, and an exit port toward said second end;

a first check valve positioned in said first end between said liquid entry port and said gas entry port, normally sealed against said gas entry port by gravitational force and movable by compressed gas flowing from said gas entry port to seal against said liquid entry port;

a second check valve positioned in said exit port, normally closed, operable by compressed fluid flow from said vessel; and means for feeding compressed gas to said vessel through said gas entry port for discrete time periods of preselected duration.

7. Apparatus for the extraction of a water-immiscible liquid of less density than water from a well in a water-bearing formation, comprising:

- an elongate liquid-retaining vessel having a first end and a second end, and having a liquid entry port and a gas entry port toward said first end and an exit port toward said second end;
- a first check valve positioned in said first end between said liquid entry port and said gas entry port, normally sealed against said gas entry port and movable by compressed gas flowing from said gas entry port to seal against said liquid entry port;
- a second check valve positioned in said exit port, normally closed, operable by compressed fluid flow from said vessel;
- means for feeding compressed gas to said vessel through said gas entry for discrete time periods of preselected duration; and
- means for sensing water external to said vessel at a first predetermined height with respect thereto toward said first end, and at a second predetermined height with respect thereto toward said second end.

8. Apparatus in accordance with claim 7 in which said water sensing means are electrical conductivity monitors.

* * * * *